United States Patent

Robinson et al.

[11] Patent Number: 6,095,901
[45] Date of Patent: Aug. 1, 2000

[54] POLISHING METHOD FOR SOFT ACRYLIC ARTICLES

[75] Inventors: Stephanie Robinson, Fort Worth; Kevin Lewellen, Arlington, both of Tex.

[73] Assignee: Alcon Laboratories, Inc., Fort Worth, Tex.

[21] Appl. No.: 09/208,184

[22] Filed: Dec. 9, 1998

Related U.S. Application Data

[60] Provisional application No. 60/068,201, Dec. 19, 1997.

[51] Int. Cl.$^7$ .......................................... B24B 1/00
[52] U.S. Cl. ................................ 451/35; 451/34; 451/42; 451/326
[58] Field of Search .................. 451/32, 34, 41, 451/35, 104, 113, 326, 328, 330, 42

[56] References Cited

U.S. PATENT DOCUMENTS

| | | | |
|---|---|---|---|
| 2,554,701 | 5/1951 | Hackett et al. | 51/281 |
| 3,535,159 | 10/1970 | Shiro | 134/1 |
| 3,874,124 | 4/1975 | Morgan et al. | 51/125 |
| 3,997,358 | 12/1976 | Taylor | 134/7 |
| 4,257,196 | 3/1981 | Walther et al. | 51/163.2 |
| 4,580,371 | 4/1986 | Akhavi | 51/313 |
| 4,796,388 | 1/1989 | Steckis | 51/164.1 |
| 5,133,159 | 4/1992 | Nelson | 51/313 |
| 5,290,892 | 3/1994 | Namdaran et al. | 526/259 |
| 5,429,838 | 7/1995 | Mansson et al. | 427/2.24 |
| 5,571,558 | 11/1996 | Nguyen et al. | 451/35 |
| 5,693,095 | 12/1997 | Freeman et al. | 623/6 |
| 5,766,243 | 6/1998 | Christensen et al. | 451/32 |
| 5,873,770 | 2/1999 | Hashimoto | 451/35 |
| 5,961,370 | 10/1999 | Valle et al. | 451/35 |

FOREIGN PATENT DOCUMENTS

| | | |
|---|---|---|
| 169439 | 6/1988 | Japan . |
| 93/06967 | 4/1993 | WIPO . |
| WO 98/19825 | 4/1998 | WIPO . |

OTHER PUBLICATIONS

Koch, D. *Foldable Intraocular Lenses*, Slack Incorporated, Thorofare, NJ, (1993), Chapter 8, "Alcon AcrySof[198]Acrylic Intraocular Lens," pp. 161–177.

*Primary Examiner*—Eileen P. Morgan
*Attorney, Agent, or Firm*—Patrick M. Ryan

[57] ABSTRACT

A method for polishing articles comprising soft acrylic materials is disclosed. The method includes a polishing step and a cleaning step. In the polishing step, a receptacle is charged with polishing beads of various sizes, alumina, a swelling agent and the articles to be polished, and agitated for a period of time and at a speed sufficient to remove surface irregularities. Following the polishing step, the polished articles are cleaned by agitating them with a cleaning slurry comprising cleaning beads of various sizes, alumina, a solvent and a surfactant for a period of time and at a speed sufficient to clean the surface of the polished articles. Agitation is preferably accomplished by a tumbling machine.

11 Claims, No Drawings

POLISHING METHOD FOR SOFT ACRYLIC ARTICLES

This application claims priority from co-pending U.S. Provisional Patent Application Ser. No. 60/068,201 filed Dec. 19, 1997.

BACKGROUND OF THE INVENTION

1. Field of the Invention

The present invention relates to methods of manufacturing products comprising acrylic materials. In particular, this invention relates to methods for polishing soft acrylic articles to remove rough surfaces and tool or machining marks.

2. Description of Related Art

Soft acrylic materials are used in the manufacture of a wide variety of products. Because soft acrylic materials are generally compatible with biological tissues and fluids, they can be particularly useful in making products for biomedical applications. Examples of such soft acrylic products include soft contact lenses and soft prosthetic implants, such as intracorneal and intraocular lenses, corneal inlays used during refractive surgery, and intracapsular rings used to support the natural lens capsule during ophthalmic surgery.

A highly polished finish, free of sharp edges or surface irregularities, is required in many biomedical applications. Implantable products, such as intraocular lenses, are in direct contact with body tissues and the tearing or abrading of tissue by rough surfaces could result in rupture of blood vessels, irritation or other trauma to the tissue. Even minute irregularities can cause irritation of body tissues. This is a particularly serious problem with contact lenses and portions of intraocular lenses that contact the eye, where the tissue is extremely sensitive.

The use of soft acrylic materials for intraocular lenses is a relatively new development. Intraocular lenses formed of soft acrylic material are advantageous in that they can be folded and inserted through smaller incisions in the cornea than previously possible, resulting in fewer post-operative complications. Rough edges resulting from the cutting of lens blanks or flashing generated during molding can cause intraocular irritation.

In addition, soft contact lenses require a highly polished finish to prevent irritation of the interior of the eyelid and corneal epithelium. The eye is extremely sensitive to imperfections in contact lenses, and even slight ridges resulting from the molding process can produce irritation and discomfort. Expensive molding procedures or individual hand-grinding techniques may be used to provide the desired finish for these lenses.

Mechanical devices utilizing smooth, frictionless movement also require highly polished, smooth surfaces of their soft acrylic products. Obtaining such a highly polished, smoothly-finished soft acrylic article is often difficult as these products are manufactured by curing acrylic material in molds, wherein even the most precise dies result in some flashing and/or irregular edges. The products may be trimmed and polished, but these finishing procedures are generally done by hand, and are both time consuming and expensive, as well as imprecise, so that they do not result in the totally smooth or regular surface required. Further, many of these articles, particularly those for biomedical applications, are relatively small, and/or irregularly shaped, causing difficulties in obtaining the desired finish, and/or clarity.

For silicone materials, such as silicone rubbers and silicone elastomers, tumble polishing processes are known. See, for example, U.S. Pat. No. 5,133,159. However, the tumble polishing methods known for articles made from silicone materials are not adequately applicable to articles made from soft acrylic materials. The removal of imperfections from small and irregularly shaped soft acrylic products is an unsolved problem in the art. It would be of great utility to provide a simple, economic, and effective method for polishing and/or clarifying soft acrylic articles for industrial, medical, and mechanical purposes.

Commonly assigned, copending U.S. patent application Ser. No. 08/962,604 discloses methods for tumble polishing soft acrylic articles. The methods comprise a cryogenic polishing step and a cleaning step.

SUMMARY OF THE INVENTION

The present invention provides methods for polishing articles comprising soft acrylic materials. The methods comprise two steps: a polishing step and a cleaning step. The polishing step comprises charging a receptacle with a polishing slurry and the articles to be polished, and agitating the receptacle for a period of time and at a speed sufficient to remove surface irregularities from the articles. The polishing slurry comprises polishing beads, alumina, and a swelling agent. The polishing step may be carried out under ambient conditions.

After polishing, the articles may contain alumina particles or a surface film or other residue causing a hazy appearance. Any alumina particles or other residue is removed in the cleaning step. The cleaning step comprises contacting the polished article with a cleaning slurry in a receptacle and agitating the receptacle for a period of time and at a speed sufficient to clean the surface of the polished articles. The cleaning slurry comprises cleaning beads, alumina, a solvent and a surfactant.

Examples of articles which may be polished according to the methods of the present invention include one-piece intraocular lenses, intraocular lens haptics, intraocular lens optics, intracapsular rings, corneal inlays, intracorneal lenses, and contact lenses.

DETAILED DESCRIPTION OF THE INVENTION

The present invention provides methods for polishing articles comprising soft acrylic materials. As used herein, "soft acrylic material" means materials comprising polymers or copolymers of acrylic acid, methacrylic acid, esters of these acids, or acrylonitrile, wherein the polymers or copolymers have a glass transition temperature ($T_g$) of about 35° C. or less, and a Shore A Hardness value of about 90 or less. Preferably the soft acrylic materials have a $T_g$ of about 25° C. or less, and most preferably 20° C. or less. The soft acrylic materials preferably have a Shore A Hardness value of about 60 or less, and most preferably about 45 or less.

Examples of soft acrylic materials suitable for making foldable intraocular lenses include but are not limited to (i) the acrylic material made from copolymerizing about 65 wt. % 2-phenylethyl acrylate, about 30 wt. % 2-phenylethyl methacrylate, an ultraviolet absorber and a cross-linking agent, and (ii) the acrylic material made from copolymerizing about 80 wt. % 2-phenylethyl acrylate, about 15 wt. % 2-hydroxyethyl methacrylate, an ultraviolet absorber and a cross-linking agent. These and other suitable soft acrylic materials are described in U.S. Pat. No. 5,290,892 and in copending, commonly-assigned U.S. patent application Ser.

No. 08/739,245. Other examples of soft acrylic materials include, but are not limited to, those disclosed in U.S. Pat. No. 5,331,073.

As used herein, the "Preferred Acrylic Material" means the soft acrylic material obtained by copolymerizing about 65 wt. % 2-phenylethyl acrylate, about 30 wt. % 2-phenylethyl methacrylate, about 1.8 wt. % o-methallyl Tinuvin P and 3.2 wt. % 1,4-butanediol diacrylate, using 1.8 wt. % Perkadox 16 as an initiator.

The present methods comprise a polishing step and a cleaning step. The polishing step may be, and is preferably, conducted under ambient conditions. In the polishing step, a receptacle is charged with a polishing slurry and the articles to be polished. The receptacle may be various sizes and shapes, and may be formed of glass, polycarbonate, or other suitable material. The receptacle is preferably a round glass container, such as a 1 liter Wheaton® glass jar with glass lid.

The polishing slurry comprises a mixture of polishing beads, alumina and one or more swelling agents. As one skilled in the art will appreciate, however, the exact composition of the polishing slurry will vary depending on a variety of factors, such as the identity of the acrylic material and the size and shape of the article to be polished. Preferably, the polishing beads are glass beads, which are relatively inexpensive and readily commercially available, but may be solid or filled beads formed of any suitable material. Commercially available glass beads are available in a variety of sizes, for example 0.3, 0.5, 1 and 2 mm sizes. The glass beads contained in the polishing slurry have preferably been preconditioned so that they are not in a raw state; that is, they have preferably been slightly worn or conditioned so that they are less likely to harm the surface of the lens.

One way to condition raw glass beads received from commercial suppliers is to sequentially tumble the beads in acidic (e.g., 2N HCL for 10 minutes) and basic (1% NaOH for 1 hour) washing solutions, respectively. After their rough surfaces have been slightly worn, the beads may be utilized in the polishing step.

The necessary number and size distribution of polishing beads will vary with the number and size of the articles to be polished, but a suitable selection can be easily determined without undue experimentation. Generally, a mixture of polishing beads of different sizes is preferred. In the case of the Preferred Acrylic Material, for example, the polishing slurry would comprise 0.5 mm and 1.0 mm glass beads in a 1:3 ratio. For example, the polishing beads added to a 1 liter receptacle would comprise approximately 1000 g of polishing beads as follows: about 250 g of 0.5 mm glass beads and about 750 g of 1.0 mm glass beads.

The polishing slurry also contains alumina as a polishing agent. Alumina polishing powder is commercially available. Available mesh sizes of alumina range from less than 0.05 micron to 3.0 micron and larger. The optimum amount and mesh size of alumina will depend on other process parameters, including the identity of the soft acrylic material. In general, however, the polishing slurry contained in a 1 liter receptacle will require a minimum of approximately 0.2% alumina to swelling agent (w/w) to achieve satisfactory results, regardless of the size and shape of the articles to be polished. Increasing the amount of alumina seems to increase the efficiency of the polishing slurry, especially as the number of articles to be polished increases, up to a maximum of about 2% (alumina to solvent, w/w). Higher concentrations of alumina may result in damage to the article(s) being processed and do not appear to provide any significant improvement in polishing efficiency or results. In the case of the Preferred Acrylic Material, the polishing slurry contains about 1% of 0.5 micron alumina to swelling agent (w/w).

In addition to polishing beads and alumina, the polishing slurry also comprises one or more swelling agents. The swelling agent ingredient slightly swells the article to be polished, making its surface(s) more brittle, thereby facilitating and improving the polishing results. In addition to slightly swelling the article to be polished, the swelling agent also serves as the medium for the alumina and polishing beads. Any agent capable of swelling the article to be polished without irreversibly damaging it will be suitable.

Suitable swelling agents include solvents, such as, but not limited to, alcohols, aliphatic hydrocarbons, chlorinated solvents, and aromatic hydrocarbons. Examples of suitable alcohol solvents include short chain alcohols (approximately 10 total carbon atoms or less), such as methanol, ethanol, and isopropanol. Examples of suitable aliphatic hydrocarbon solvents include pentane, hexane, heptane and mineral spirits. Examples of suitable chlorinated solvents include methylene chloride and trichloromethane. Examples of suitable aromatic hydrocarbon solvents include benzene and toluene. Preferred solvents include mineral spirits with flash points of about 90–145° F., such as the mineral spirits fraction known as stoddard solvent.

Just as in the case of determining the optimum amount of alumina to include in the polishing slurry, the identity and amount of swelling agent which should be included in the polishing slurry will depend upon the identity of the chosen soft acrylic material. For certain acrylic materials and polishing conditions, swelling agents having specific boiling point ranges or glass transition temperatures will function better than others in the polishing slurry. In the case of the Preferred Acrylic Material, the preferred swelling agent is a commercially available mineral spirits fraction known as "stoddard solvent." Other mineral spirit fractions or other swelling agents may be more suitable for soft acrylic materials other than the Preferred Acrylic Material. In general, a suitable amount of swelling agent is that amount which is sufficient to cover the standing volume of polishing beads contained in the polishing slurry. Thus, in a one liter receptacle containing approximately 1000 g of glass polishing beads, the preferred polishing slurry for the Preferred Acrylic Material comprises about 250 mL of stoddard solvent as the mineral spirits ingredient.

The polishing slurry is preferably formulated in the receptacle in the absence of the acrylic articles that are to be polished. For example, alumina and the chosen swelling agent ingredient are first added to the receptacle containing the polishing beads. The polishing slurry is then mixed before the articles to be polished are added. In the case of a 1 liter receptacle and the polishing slurry for the Preferred Acrylic Material, for example, the complete polishing slurry is tumbled for a short time (approximately 30 minutes) at room temperature before the articles to be polished are added.

Once the articles to be polished are added to the mixed polishing slurry, the receptacle is agitated for a time and at a speed sufficient to remove any rough spots, sharp edges, and any tool or machining marks from the articles' surfaces. Agitation is preferably accomplished by placing the receptacle on a rotational apparatus such as a commercially available tumbling machine (e.g., Model 3BAR from Topline Mfg. Co., Fullerton, Calif.). The optimal time and rotation speed will vary with the batch size, identity of the soft acrylic material, the size and shape of the articles to be polished, etc. When the methods of the present invention are used to polish intraocular lenses, a typical batch size will be on the order of 50–100 lenses for a 1 liter receptacle. In the case of the Preferred Acrylic Material, excellent polishing results are obtained when the article is tumble-polished for approximately 3–10 days, with the rotation speed of the receptacle being approximately 80 rpm.

After the polishing step, the articles may be separated from the polishing beads by emptying the contents of the polishing jar into a sieve stack so that the swelling agent is drained away. The articles then may be rinsed by flushing with either fresh solvent or deionized water to separate the lenses from the beads. The polished articles will appear very smooth, but may contain alumina particles on the surface and/or may appear hazy or frosty, as if there is a residue on the surface of the polished articles. Any alumina particles and any surface residue is removed in a cleaning step.

After the articles are polished but before they are subjected to the cleaning step, it may be advantageous to reduce or eliminate any residual swelling agent from the articles' surfaces in the event that the chosen cleaning slurry contains a solvent different than the swelling agent chosen for the polishing slurry. This can be accomplished by briefly cleaning the articles in a commercially available ultrasonic cleaner. Cleaning solutions suitable for use in ultrasonic cleaners generally include solvents, detergents, water and mixtures thereof. The exact composition of the cleaning solution is not critical, though it may be desirable to adjust the composition's ingredients based upon the identity of the chosen solvent. In the case where the swelling agent is chosen to be stoddard solvent, a suitable stock ultrasonic cleaning solution comprises a mixture of water, 2-butoxyethanol, Micro® detergent, and ammonium hydroxide.

Following ultrasonic cleaning, if any, the polished articles are cleaned in an agitating receptacle containing a cleaning slurry comprising cleaning beads, alumina, a solvent and a surfactant. The solvent is preferably the same as any solvent utilized in the polishing slurry. As in the polishing step above, the agitation is preferably achieved by means of a rotational machine. The receptacle is preferably a 1 liter round glass jar with a glass lid, though any receptacle having a shape in which the articles to be cleaned do not stick (e.g., in corners of a square jar) or get caught (e.g., in a neck area connecting the body cavity to the lid) would be suitable. The cleaning beads may be of the same type as those suitable for use as polishing beads. As in the case of the polishing beads, the cleaning beads are preferably conditioned glass beads. In general, a mixture of cleaning beads of different sizes is preferred.

The necessary number and size distribution of cleaning beads will vary with the number and size of the articles to be polished, but a suitable selection can be easily determined without undue experimentation. In the case of the Preferred Acrylic Material, for example, the cleaning slurry added to a 1 liter receptacle would comprise approximately 1000 g of cleaning beads as follows: about 250 g of 0.5 mm glass beads and about 750 g of 1.0 mm glass beads (larger sizes of beads are generally avoided in an attempt to reduce the possibility that the cleaning beads will damage the surface of the articles).

The cleaning slurry contains alumina, a surfactant, and a solvent in which the alumina is not soluble. The most preferred solvents are mineral spirits solvents having a flash point of about 90–145° F., such as stoddard solvent. In a preferred embodiment, the polishing slurry contains a solvent as the swelling agent and the cleaning slurry contains the same solvent. This simplifies the polishing and cleaning process by eliminating the need to recover and rinse the lenses between the polishing and cleaning steps. In this preferred embodiment, the cleaning step may begin after simply adding a suitable surfactant directly to the polishing slurry in the receptacle used for polishing once the polishing step is complete.

Suitable surfactants for use in the cleaning slurry are those that dissolve in the chosen solvent and aid in suspending the alumina particles in the solvent. The preferred amount of surfactant in the cleaning slurry is that amount which provides about a 1:1 ratio (w/w) with the amount of alumina in the cleaning slurry. Reducing the ratio of surfactant to alumina may allow the alumina particles to become imbedded in, or cause damage to, the surface of the articles being cleaned. Increasing the ratio of surfactant to alumina may reduce the effectiveness of the cleaning process. The preferred surfactant for use with stoddard solvent is dioctyl sulfosuccinate ("DSS"), a commercially available surfactant.

The preferred amount and "mesh size" of the alumina for use in the cleaning slurry will depend on other process parameters, including the identity of the soft acrylic material. In general, however, the cleaning slurry contained in a 1 liter receptacle will require a minimum of approximately 0.2% of alumina to solvent (w/w) to achieve acceptable cleaning results, regardless of the size and shape of the articles being cleaned. Increasing the amount of alumina and surfactant seems to increase the efficiency of the cleaning slurry, up to a maximum of about 2% (w/w of each alumina and surfactant). Higher concentrations may damage the articles being cleaned and do not appear to significantly improve cleaning results. In the case of the Preferred Acrylic Material, the cleaning slurry contains 1% of 0.05 micron alumina, and 1% DSS to solvent (w/w).

The volume of liquid which should be included in the cleaning slurry depends upon the volume of cleaning beads, the number and size of the articles to be tumble-cleaned, etc. In general for tumble cleaning, however, the cleaning slurry should contain a liquid level sufficient to prevent the cleaning beads from becoming too dry and riding along the inside surface of the cleaning receptacle to the extent that they fall sporadically or too violently. Instead, the cleaning beads should tumble relatively smoothly. Likewise, the volume of liquid in the cleaning slurry should not be too great that the articles to be cleaned float or remain outside the stream of tumbling cleaning beads. For example, in the case of the Preferred Acrylic Material, a 1 liter receptacle containing 1000 g of glass cleaning beads as described above, will contain approximately 250 mL of liquid.

The cleaning step is preferably conducted at a temperature sufficiently above the soft acrylic material's glass-transition temperature to insure that the article in cleaning slurry is soft and at least slightly flexible to aid in the removal of any frosty or hazy residue. In the case of the Preferred Acrylic Material, the cleaning step is preferably conducted at about 18° C. or higher.

As in the case of the polishing step, the optimal time and rotation speed for the cleaning step will vary with the batch size, identity of the soft acrylic material, the size and shape of the articles to be cleaned, the condition of the cleaning beads, etc. When the methods of the present invention are used to polish intraocular lenses, a typical batch size will be on the order of 50–100 lenses for a 1 liter receptacle. In the case of the Preferred Acrylic Material, excellent polishing results are obtained when the article is tumble-polished for approximately 3–10 days, with the rotation speed of the receptacle being approximately 80 rpm. After approximately 1–3 days of tumble cleaning with a rotation speed of the receptacle being approximately 80 rpm, intraocular lenses made of the Preferred Acrylic Material are very clean (no frosty appearance) and optically clear with little or no cosmetic blemishes.

Certain embodiments of the present invention are illustrated in the following examples.

EXAMPLE 1

Tumble Polishing of Intraocular Lenses

Preferred Acrylic Material

A 1000 mL round glass tumbling jar was filled with approximately 1000 g of a mixture of glass polishing beads. The mixture contained approximately 25% 0.5 mm, and 75% 1.0 mm glass beads. To this was added 2.0 g of 0.05 micron Alumina polishing powder (Baikowski International Corp., Charlotte, N.C.) and 250 mls of stoddard solvent (EM Scientific, Gibbstown, N.J.). The jar and its contents were placed on a modified 3BAR tumbler (Topline Mfg. Co.). The tumbling unit was switched on low speed (80 RPM), and the jar was tumbled for approximately 15 minutes at Ambient temperature (21.0° C.) to allow the contents to mix prior to adding one piece intraocular lenses made from Preferred Acrylic Material. After adding 10 lenses, the jar which was placed back into the tumbler and tumbled for 5 days. After tumbling, the jar was removed and its contents were poured into a No. 6 sieve to separate the lenses from the glass beads. They were then rinsed with deionized water for 2 minutes, and dried with compressed air. A sample lens was inspected at 16X for roundness and surface finish quality. It appeared highly polished. All machining lines had been removed and the optic and haptics edges were smooth and rounded. A very slight haze covering the entire surface of the lens was also observed post tumbling.

EXAMPLE 2

Tumble Cleaning of Intraocular Lenses Polished in Example 1

Solvent-based Cleaning Slurry

A 1000 ml round glass jar was filled with approximately 1000 g of a mixture glass cleaning beads. The mixture contained approximately 25% 0.5 mm and 75% 1.0 mm glass beads. To this was added approximately 1.0 g of 0.05 mesh size alumina polish, and 1.0 g of dioctyl sulfosuccinate (DSS). Finally, about 250 ml of stoddard solvent was added to the jar to complete the cleaning slurry mixture. The polished lenses from example 1 were then added to the cleaning jar, which was sealed and placed onto the 3BAR tumbler (Topline Mfg. Co.). The jar and its content were tumbled at 80 r.p.m. for approximately 3 days at room temperature (21.0° C.). At the conclusion of the cleaning cycle, the jar was removed from the tumbler and its contents poured into a No. 6 sieve to separate the lenses from the cleaning beads. The lenses were rinsed briefly with deionized water and allowed to air dry. A sample lens was inspected at 16X to determine whether the surface haze was successfully removed. The lens surface appeared clean and clear.

EXAMPLE 3

Tumble Polishing/Cleaning of Intraocular Lenses

Preferred Acrylic Material

A 1000 mL round glass tumbling jar was filled with approximately 1000 g of a mixture of glass polishing beads. The mixture contained approximately 25% 0.5 mm, and 75% 1.0 mm glass beads. To this was added 1.5 g of 0.05 micron Alumina polishing powder (Baikowski International Corp., Charlotte, N.C.) and 250 mls of stoddard solvent (EM Scientific, Gibbstown, N.J.). The jar and its contents were placed on a modified 3BAR tumbler (Topline Mfg. Co.). The tumbling unit was switched on low speed (80 RPM), and the jar was tumbled for approximately 15 minutes at Ambient temperature (21.0° C.) to allow the contents to mix prior to adding one piece intraocular lenses made from Preferred Acrylic Material. After adding 10 lenses, the jar which was placed back into the tumbler and tumbled for 9 days. After an acceptable polishing level of the lens samples had been achieved, the jar was removed from the tumbler and opened. To it was added 1.0 g of dioctyl sulfosuccinate (DSS), which essentially transformed the polishing slurry into a cleaning slurry. The jar was then re-sealed, and returned to the tumbler and tumbled at low speed (80 rpm), for an additional 3 days. At the completion of the cleaning cycle, the jar was again removed from the tumbler and its contents were poured into a No. 6 sieve to separate the lenses from the glass beads. They were then rinsed with deionized water for 2 minutes, and dried with compressed air. A sample lens was inspected at 16X for roundness and surface finish quality. All machining lines had been removed and the optic and haptics edges were smooth and rounded. The lens surface appeared clean and highly polished, with no trace of surface haze.

The invention has been described by reference to certain preferred embodiments; however, it should be understood that it may be embodied in other specific forms or variations thereof without departing from its spirit or essential characteristics. The embodiments described above are therefore considered to be illustrative in all respects and not restrictive, the scope of the invention being indicated by the appended claims rather than by the foregoing description.

What is claimed is:

1. A method of polishing an article comprising a soft acrylic material, wherein the method comprises:

a) polishing the article by charging a receptacle with a polishing slurry and the article to be polished, and agitating the receptacle for a period of time and at a speed sufficient to remove surface irregularities from the article, wherein the polishing slurry consists essentially of polishing beads, alumina, and a non-aqueous swelling agent selected from the group consisting of aliphatic hydrocarbons; chlorinated solvents; and aromatic hydrocarbons; and b) cleaning the polished article by contacting it with a cleaning slurry in a receptacle and agitating the receptacle for a period of time and at a speed sufficient to clean the surface of the article, wherein the cleaning slurry comprises cleaning beads, alumina, a surfactant, and a non-aqueous solvent selected from the group consisting of aliphatic hydrocarbons; chlorinated solvents; and aromatic hydrocarbons, and wherein the alumina and surfactant are present in about a 1:1 ratio (w/w).

2. The method of claim 1 wherein the polishing beads and the cleaning beads are glass beads.

3. The method of claim 2 wherein the polishing beads comprise 0.5 mm and 1 mm glass beads in a 1:3 ratio.

4. The method of claim 2 wherein the cleaning beads comprise 0.5 mm and 1 mm glass beads in a 1:3 ratio and the amount of alumina in the cleaning slurry is about 0.2 to 2% (alumina to solvent, w/w).

5. The method of claim 1 wherein the amount of alumina in the polishing slurry is at least 0.2% (alumina to swelling agent, w/w).

6. The method of claim 1 wherein the swelling agent is a solvent selected from the group consisting of aliphatic hydrocarbons and aromatic hydrocarbons.

7. The method of claim 6 wherein the solvent is a mineral spirits solvent having a flash point of about 90–145° F.

8. The method of claim 1 wherein the surfactant in the cleaning slurry is present in about a 1:1 ratio (w/w) relative to the amount of alumina in the cleaning slurry.

9. The method of claim 1 wherein the cleaning slurry is prepared by adding a surfactant to the polishing slurry and the receptacle used for cleaning is the same as the receptacle used for polishing.

10. The method of claim 1 wherein the article is selected from the group consisting of one-piece intraocular lenses, intraocular lens haptics, intraocular lens optics, intracapsular rings, corneal inlays, intracorneal lenses, and contact lenses.

11. A soft acrylic article polished according to the method of claim 1.

* * * * *